(12) United States Patent
Suzuki

(10) Patent No.: US 12,443,232 B2
(45) Date of Patent: Oct. 14, 2025

(54) PORT REPLICATOR

(71) Applicant: Panasonic Intellectual Property Management Co., Ltd., Osaka (JP)

(72) Inventor: Takamitsu Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/772,379

(22) Filed: Jul. 15, 2024

(65) Prior Publication Data

US 2024/0370055 A1 Nov. 7, 2024

Related U.S. Application Data

(63) Continuation of application No. PCT/JP2022/041739, filed on Nov. 9, 2022.

(30) Foreign Application Priority Data

Jan. 26, 2022 (JP) .................................. 2022-010373

(51) Int. Cl.
*G06F 1/16* (2006.01)
*G06F 13/40* (2006.01)
*H01R 13/639* (2006.01)

(52) U.S. Cl.
CPC .......... *G06F 1/1632* (2013.01); *H01R 13/639* (2013.01)

(58) Field of Classification Search
None
See application file for complete search history.

(56) References Cited

U.S. PATENT DOCUMENTS

| | | | | |
|---|---|---|---|---|
| 5,313,596 A | * | 5/1994 | Swindler ............... | G06F 1/1632 361/679.55 |
| 5,568,359 A | * | 10/1996 | Cavello ................. | G06F 1/1632 361/679.45 |
| 5,694,292 A | * | 12/1997 | Paulsel ................. | G06F 1/1632 361/679.48 |

(Continued)

FOREIGN PATENT DOCUMENTS

| | | |
|---|---|---|
| JP | 2005-301964 A | 10/2005 |
| JP | 2008-004100 A | 1/2008 |
| JP | 2019-061652 A | 4/2019 |

OTHER PUBLICATIONS

International Search Report for corresponding Application No. PCT/JP2022/041739, mailed Dec. 27, 2022.

*Primary Examiner* — Hyun Nam
(74) *Attorney, Agent, or Firm* — Renner, Otto, Boisselle & Sklar, LLP

(57) ABSTRACT

A port replicator of the present disclosure includes: a main body including a placement surface on which an electronic device is placed, and a first hole and a second hole provided in the placement surface; a pop-up component that is disposed in the first hole and is movable in a direction intersecting the placement surface; a shaft that is disposed in the main body and rotatable; a hook component that is disposed in the second hole and fixed to the shaft; a stopper that is disposed in the main body and fixed to the shaft; and a link component that is disposed in the main body, is movable in a direction intersecting an axial direction of the shaft, and is in contact with the stopper. The pop-up component comes into contact with the link component by moving in a direction intersecting the placement surface.

14 Claims, 10 Drawing Sheets

(56) References Cited

U.S. PATENT DOCUMENTS

| | | | | |
|---|---|---|---|---|
| 6,034,869 | A * | 3/2000 | Lin | G06F 1/1632 361/679.43 |
| 6,264,484 | B1 * | 7/2001 | Chien | G06F 1/1632 361/679.44 |
| 6,927,972 | B1 * | 8/2005 | Wang | G06F 1/1616 361/679.55 |
| 9,778,695 | B1 * | 10/2017 | Shibayama | G06F 1/1679 |
| 10,067,533 | B1 * | 9/2018 | Powell | G06F 1/1679 |
| 2004/0075980 | A1 * | 4/2004 | Park | G06F 1/1632 361/679.43 |
| 2005/0128687 | A1 * | 6/2005 | Liang | G06F 1/1632 361/679.57 |
| 2006/0139875 | A1 * | 6/2006 | Cheng | G06F 1/1632 361/679.57 |
| 2006/0171112 | A1 * | 8/2006 | Lev | G06F 1/1632 361/679.41 |
| 2007/0297130 | A1 * | 12/2007 | Fan | G06F 1/1632 361/679.44 |
| 2008/0002352 | A1 * | 1/2008 | Carnevali | G06F 1/16 361/679.41 |
| 2008/0003860 | A1 * | 1/2008 | Carnevali | H01R 31/005 439/296 |
| 2009/0113228 | A1 * | 4/2009 | Mok | G06F 1/3203 713/323 |
| 2010/0318710 | A1 * | 12/2010 | Downing | G06F 1/1632 710/304 |
| 2017/0102735 | A1 * | 4/2017 | Blowers | E05B 73/0082 |
| 2019/0094907 | A1 * | 3/2019 | Tatsuno | G06F 1/166 |
| 2023/0219697 | A1 * | 7/2023 | Hwang | B64F 1/32 244/114 R |
| 2024/0370055 | A1 * | 11/2024 | Suzuki | G06F 1/16 |

* cited by examiner

PORT REPLICATOR

TECHNICAL FIELD

The present disclosure relates to a port replicator.

BACKGROUND ART

PTL 1 discloses a docking station. The docking station described in PTL 1 includes a cover, a connector, a hook, a link, and an inspection pin. The cover is provided with a first hole, a second hole, and a third hole. The connector is attached to the first hole and is electrically connected to an external equipment. The hook is attached to the second hole and engaged with the external equipment. The link moves such that the hook and the external equipment separate. The inspection pin is attached to the third hole, and includes a first guide surface and a first connection surface. When the external equipment and the connector are separated, the inspection pin and the link are separated, and when the external equipment and the connector are connected, the inspection pin and the link abut on each other. When the first guide surface and the link are connected, the link slides, and when the first connection surface and the link abut on each other, the link stops.

CITATION LIST

Patent Literature

PTL 1: Unexamined Japanese Patent Publication No. 2008-4100

SUMMARY OF THE INVENTION

In the docking station described in PTL 1, there is still room for improvement in terms of attachment and detachment of an electronic device with a simple configuration.

The present disclosure provides a port replicator capable of attaching and detaching an electronic device with a simple configuration.

A port replicator according to an aspect of the present disclosure is a port replicator that extends an input and output terminal of an electronic device, the port replicator including:
 a main body including a placement surface on which the electronic device is placed, and a first hole and a second hole provided in the placement surface;
 a pop-up component that is disposed in the first hole and is movable in a direction intersecting the placement surface;
 a shaft that is disposed in the main body and rotatable;
 a hook component that is disposed in the second hole and fixed to the shaft;
 a stopper that is disposed in the main body and fixed to the shaft; and
 a link component that is disposed in the main body, is movable in a movement direction that is a direction intersecting an axial direction of the shaft, and is in contact with the stopper.

The pop-up component comes into contact with the link component by moving in a direction intersecting the placement surface, the link component moves by contact with the pop-up component to release contact between the stopper and the link component, the shaft rotates when the stopper and the link are released from contact with each other, and the hook component is rotated by rotation of the shaft to engage with the electronic device.

According to the present disclosure, it is possible to provide a port replicator capable of attaching and detaching an electronic device with a simple configuration.

DESCRIPTION OF EMBODIMENT

Background to the Present Invention

Figure 1:
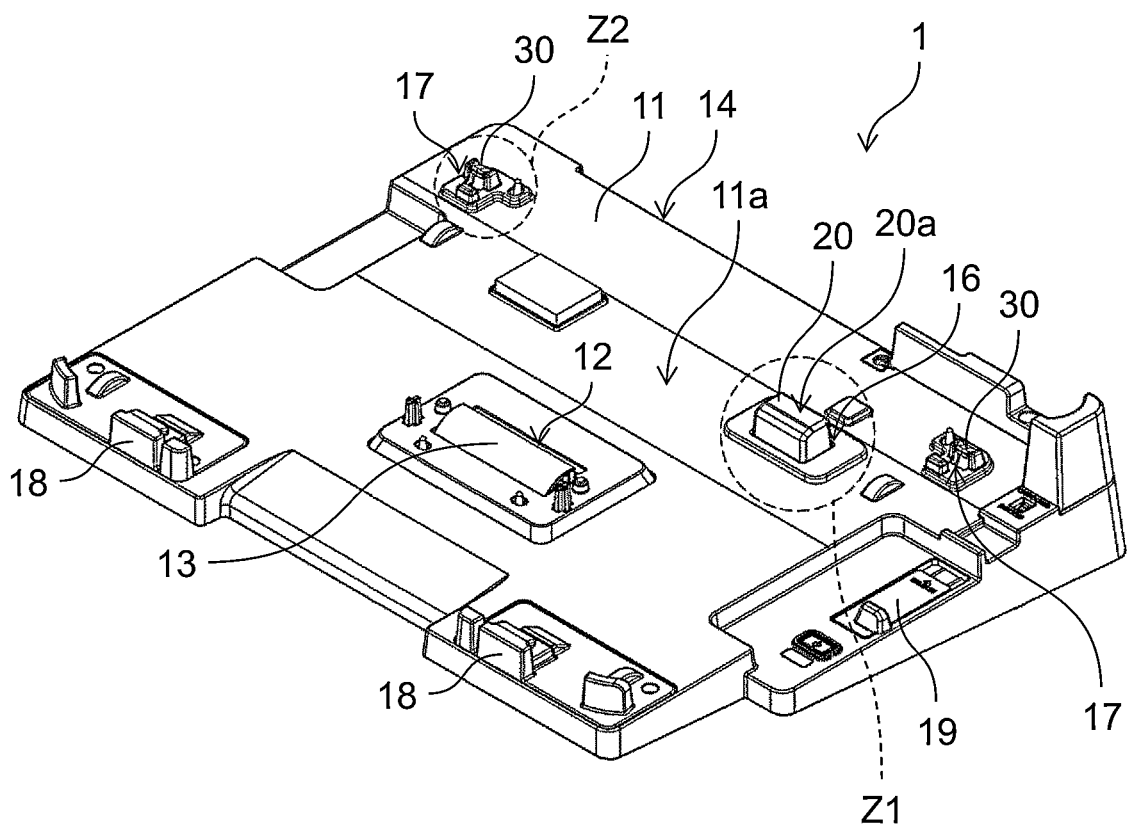
FIG. 1 is a perspective view illustrating a port replicator according to a first exemplary embodiment of the present disclosure.
Figure 1:
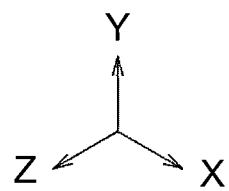

A docking device called a port replicator that can be connected to an electronic device such as a laptop PC or a tablet PC to extend an input and output terminal and the like is known. For example, the port replicator extends the function of the laptop PC by placing the laptop PC on its upper surface and connecting to the laptop PC.

In such a port replicator, an electronic device is attached and detached using a pop-up component and a hook component. The pop-up component is pushed down in a state where the electronic device is attached to the port replicator, and is pushed up when the electronic device is removed from the port replicator. When the pop-up component is pushed down, the electronic device and the port replicator are electrically connected. When the pop-up component is pushed up, the electrical connection between the electronic device and the port replicator is released. When the pop-up component is pushed down, the hook component engages the electronic device and secures the electronic device to the port replicator. When the pop-up component is pushed up, the hook component disengages the electronic device and releases fixing of the electronic device from the port replicator.

However, the configuration in which the electronic device is attached to and detached from the port replicator using the pop-up component and the hook component has a problem that the configuration becomes complicated because the number of components increases.

Therefore, the present inventors have studied a port replicator capable of detaching an electronic device with a simple configuration, and have reached the following disclosure.

A port replicator according to a first aspect of the present disclosure is a port replicator that extends an input and output terminal of an electronic device, the port replicator including: a main body including a placement surface on which the electronic device is placed, and a first hole and a second hole provided in the placement surface; a pop-up component that is disposed in the first hole to be movable in a direction intersecting the placement surface; a shaft disposed in the main body to be rotatable; a hook component that is disposed in the second hole and fixed to the shaft; a stopper that is disposed in the main body and fixed to the shaft; and a link component that is disposed in the main body to be movable in a direction intersecting an axial direction of the shaft, and is in contact with the stopper, in which the pop-up component comes into contact with the link component by moving in a direction intersecting the placement surface, the link component moves by contact with the pop-up component to release contact with the stopper, the shaft rotates when the stopper and the link component are released from contact with each other, and the hook component is rotated by rotation of the shaft.

With such a configuration, the electronic device can be attached and detached with a simple configuration.

In a port replicator according to a second aspect of the present disclosure, the pop-up component is movable in a protruding direction protruding from the first hole and a housing direction opposite to the protruding direction, the shaft is rotatable in a first rotation direction and a second rotation direction opposite to the first rotation direction, the link component is movable in a first direction away from the shaft and a second direction opposite to the first direction, and the port replicator may further include: a first elastic member that biases the pop-up component in the protruding direction; a second elastic member that biases the shaft in the second rotation direction; and a third elastic member that biases the link component in a first direction away from the shaft.

With such a configuration, the electronic device can be attached and detached with a simpler configuration.

In a port replicator according to a third aspect of the present disclosure, in a state where the pop-up component is moved in the protruding direction by the first elastic member and protrudes from the first hole, the link component may be moved in the first direction by the third elastic member and disposed at a first position at which the link component comes into contact with the stopper, the shaft may be held in a state of being rotated in the first rotation direction by the stopper coming into contact with the link component, and the hook component may be disposed at an engagement release position where the engagement with the electronic device is released, and in a state where the pop-up component is moved in the housing direction and housed in the first hole, the link component may be moved in the second direction by coming into contact with the pop-up component and disposed at a second position at which the link component releases the contact with the stopper, the shaft may be rotated in the second rotation direction by the second elastic member when the stopper and the link component are released from contact with each other, and the hook component may be disposed at an engagement position to be engaged with the electronic device by rotation of the shaft.

With such a configuration, it is possible to attach and detach the electronic device by operating the pop-up component and the hook component in conjunction with each other.

In a port replicator according to a fourth aspect of the present disclosure, when the link component is disposed at the second position, a gap may be provided between the link component and the stopper.

With such a configuration, it is possible to suppress the stopper from colliding with the link component and being damaged.

In a port replicator according to a fifth aspect of the present disclosure, the link component may have a first surface in contact with the pop-up component, and the first surface may be inclined with respect to a movement direction of the link component.

With such a configuration, the movement amount of the link component can be increased, and the link component can be smoothly moved.

In a port replicator according to a sixth aspect of the present disclosure, the pop-up component may have a second surface in contact with the link component, and the second surface may be inclined with respect to the movement direction of the link component.

With such a configuration, the link component can be moved more smoothly.

A port replicator according to a seventh aspect of the present disclosure may further include a contact plate disposed on one of the first surface and the second surface, and the contact plate may be made of a material different from materials of the pop-up component and the link component.

With such a configuration, since the first surface and the second surface are in contact with each other via the contact plate, friction between the pop-up component and the link component can be reduced.

In a port replicator according to an eighth aspect of the present disclosure, the first surface may have an inclination angle of 35° or more and less than 45° with respect to the movement direction of the link component.

With such a configuration, the link component can be smoothly moved.

In a port replicator according to a ninth aspect of the present disclosure, when viewed from a direction orthogonal to the placement surface of the main body, a through hole may be provided at a center of the link component, and the pop-up component may be disposed in the through hole.

With such a configuration, it is possible to more smoothly move the link component due to the contact with the pop-up component.

In a port replicator according to a tenth aspect of the present disclosure, the third elastic member may include a plurality of springs arranged symmetrically with the pop-up component interposed therebetween when viewed from a direction orthogonal to the placement surface of the main body.

With such a configuration, the stress applied to the link component can be dispersed by the third elastic member, and the durability of the link component can be improved.

In a port replicator according to an eleventh aspect of the present disclosure, the link component may have a stopper contact surface that comes into contact with the stopper, and the stopper contact surface may be disposed at a center of an end portion of the link component disposed on the shaft side when viewed from a direction orthogonal to the placement surface of the main body.

With such a configuration, it is possible to suppress the link component from moving in an inclined manner and move the link component smoothly.

In a port replicator according to a twelfth aspect of the present disclosure, the stopper and the pop-up component may be linearly disposed in a direction orthogonal to the axial direction of the shaft when viewed from a direction orthogonal to the placement surface of the main body.

With such a configuration, pop-up component 20 and link component 60 can be easily interlocked with each other with a simpler configuration.

In a port replicator according to a thirteenth aspect of the present disclosure, the hook component may include: a hook body fixed to the shaft; and an engaging portion extending from the hook body in a first extending direction intersecting a rotation axis of the shaft and bent in a second extending direction intersecting the first extending direction, and the engaging portion may have an end surface inclined toward an inside of the engaging portion at a portion extending in the second extending direction.

With such a configuration, engagement and engagement release of the hook component with the electronic device can be easily performed.

First Exemplary Embodiment

[Overall Configuration]

Figure 2:
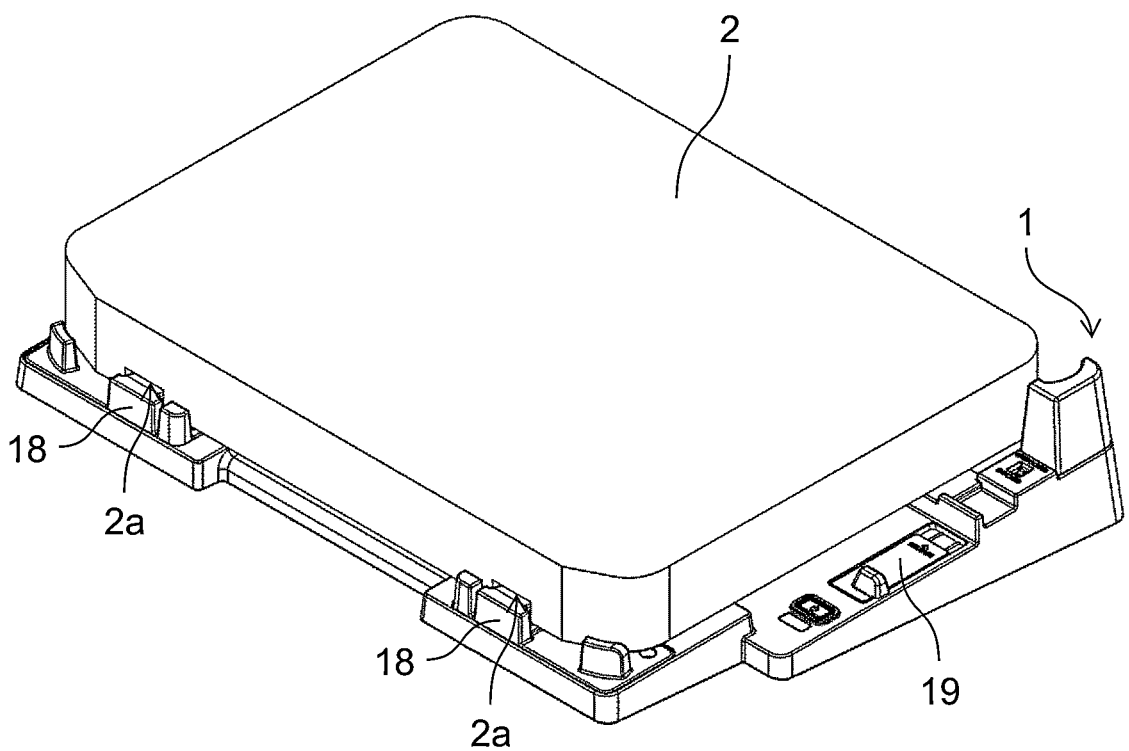
FIG. 2 is a perspective view illustrating an example in which an electronic device is placed on the port replicator of FIG. 1.
Figure 3:
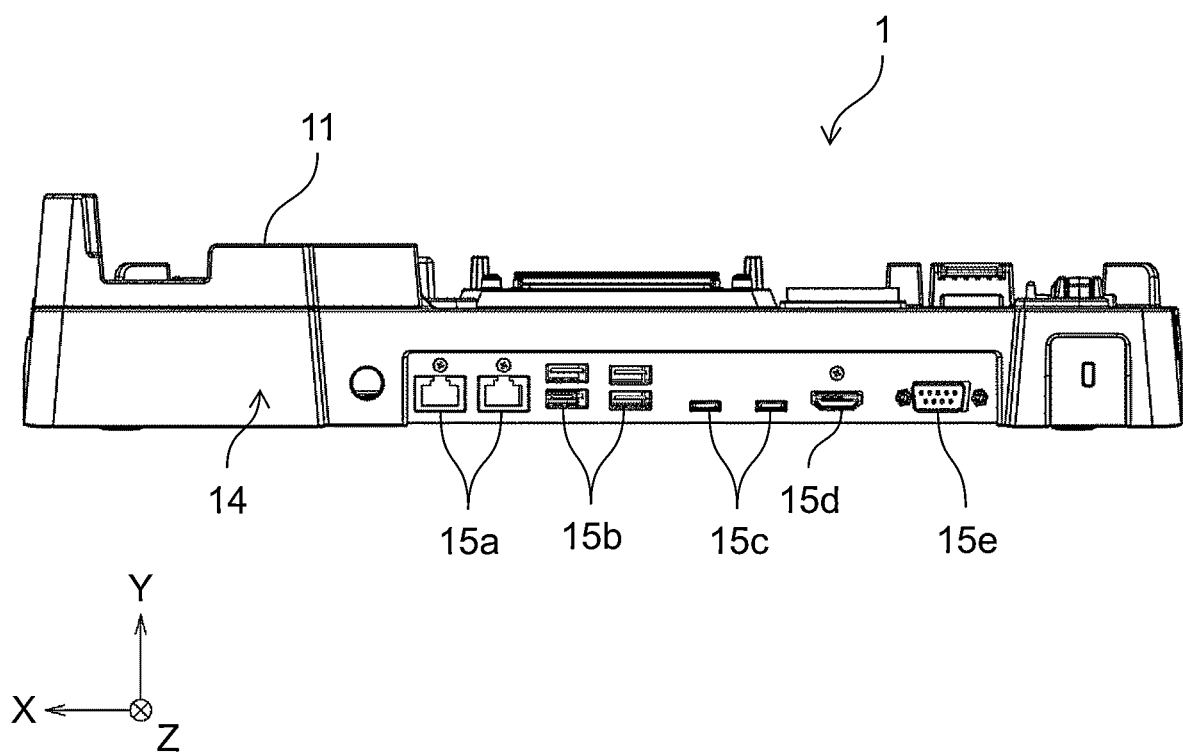
FIG. 3 is a side view of the port replicator of FIG. 1.

FIG. 1 is a perspective view illustrating port replicator 1 according to a first exemplary embodiment of the present disclosure. FIG. 2 is a perspective view illustrating an example in which electronic device 2 is placed on port replicator 1 of FIG. 1. FIG. 3 is a side view of port replicator 1 of FIG. 1. In the following description, the X direction in each drawing may be referred to as a width direction, the Y direction may be referred to as a thickness direction, and the Z direction may be referred to as a depth direction.

As illustrated in FIGS. 1 to 3, port replicator 1 is a device that extends functions of electronic device 2 such as a laptop PC or a tablet PC. For example, as shown in FIG. 2, when electronic device 2 is placed on port replicator 1, port replicator 1 and electronic device 2 are connected, and additional input and output terminals 15a to 15e (see FIG. 3) can be used in addition to the input and output terminals mounted on electronic device 2. Note that, in the present specification, connecting port replicator 1 and electronic device 2 indicates that port replicator 1 and electronic device 2 are electrically connected via connector 12 to be described later.

As illustrated in FIG. 1, port replicator 1 includes main body 11, pop-up component 20, and hook component 30.

<Main Body>

Electronic device 2 such as a laptop PC or a tablet PC is placed on main body 11. In the present exemplary embodiment, main body 11 is formed in a rectangular shape in plan view, and includes placement surface 11a on which electronic device 2 is placed. Main body 11 can be formed of, for example, resin. The term "plan view" means viewing from a direction orthogonal to placement surface 11a of main body 11, that is, from the Y direction.

For example, placement surface 11a is inclined such that the height decreases toward the front side of port replicator 1. By disposing placement surface 11a in an inclined manner, usability when electronic device 2 is placed on port replicator 1 is improved. The front side of port replicator 1 means an end side of port replicator 1 in the +Z direction in FIG. 1.

Connector 12 for electrically connecting port replicator 1 and electronic device 2 is disposed on placement surface 11a. For example, when viewed from a direction orthogonal to placement surface 11a, connector 12 and cover 13 are disposed near substantially the center of placement surface 11a. By connecting connector 12 to a connector (not illustrated) provided in electronic device 2, port replicator 1 and electronic device 2 can be electrically connected. In the present exemplary embodiment, when electronic device 2 is not connected to the connector, connector 12 is covered with cover 13. When electronic device 2 is connected to the connector, cover 13 is opened. Cover 13 is not an essential component.

As illustrated in FIG. 3, various input and output terminals 15a to 15e are arranged on side surface 14 of main body 11. Side surface 14 is disposed on the back side of port replicator 1 in main body 11. The back side of port replicator 1 means an end side in the −Z direction in FIG. 1. The input and output terminals 15a to 15e are ports to which cables, connectors, or the like are connected. In the present exemplary embodiment, for example, LAN port 15a, USB-A port 15b, USB-C port 15c, HDMI (registered trademark) port 15d, and serial port 15e are arranged on side surface 14 of port replicator 1. The type and the number of ports arranged in port replicator 1 are not limited thereto, and may be more or less than the example shown in FIG. 3.

As illustrated in FIG. 1, placement surface 11a is provided with first hole 16 and second hole 17. First hole 16 and second hole 17 are holes provided in a direction orthogonal to placement surface 11a. First hole 16 and second hole 17 are formed in a substantially rectangular shape when viewed in a direction orthogonal to placement surface 11a, that is, the Y direction. Pop-up component 20 is disposed in first hole 16. Hook component 30 is disposed in second hole 17. In the present exemplary embodiment, placement surface 11a is provided with one first hole 16 and two second holes 17. First hole 16 is provided on the front side of port replicator 1 with respect to two second holes 17 and between two second holes 17.

Fixing portion 18 is provided on the front side of placement surface 11a. Fixing portion 18 fixes the end of electronic device 2. Fixing portion 18 has a plate shape that extends in a direction (Y direction) intersecting placement surface 11a and is bent from the front side toward the back side of port replicator 1. Fixing portion 18 is, for example, a hook. For example, fixing portion 18 is disposed in side recess 2a provided at an end of electronic device 2. In the present exemplary embodiment, two fixing portions 18 are provided on the front side of placement surface 11a.

Release lever 19 is disposed on main body 11. Release lever 19 detaches electronic device 2 attached to port replicator 1. Specifically, release lever 19 pushes up pop-up component 20 and rotates hook component 30. As a result, engagement between hook component 30 and electronic device 2 is released, and pop-up component 20 is pushed up. As a result, electronic device 2 is removed from port replicator 1.

<Pop-Up Component>

Pop-up component 20 is disposed in first hole 16 of main body 11 and moves in a direction intersecting placement surface 11a. In the present exemplary embodiment, pop-up component 20 moves in a direction orthogonal to placement surface 11a, that is, in the Y direction.

Pop-up component 20 has support surface 20a that supports the bottom surface of electronic device 2. Support surface 20a comes into contact with the bottom surface of electronic device 2 to support electronic device 2 in a state where electronic device 2 is attached to port replicator 1. For example, support surface 20a is formed flat. Support surface 20a is disposed substantially parallel to placement surface 11a.

Pop-up component 20 can connect and disconnect electronic device 2 to and from connector 12 by moving in a direction (Y direction) orthogonal to placement surface 11a. As a result, electronic device 2 and port replicator 1 can be electrically connected and disconnected by the movement of pop-up component 20.

Figure 4A:
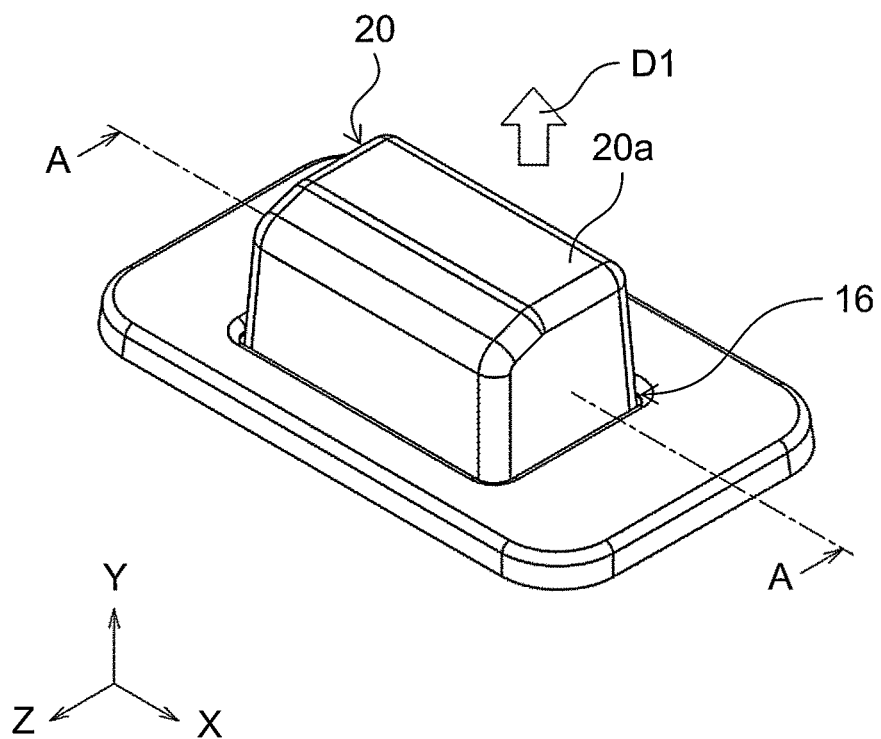
FIG. 4A is an enlarged view illustrating an example of operation of a pop-up component in a region Z1 in FIG. 1.
Figure 4B:
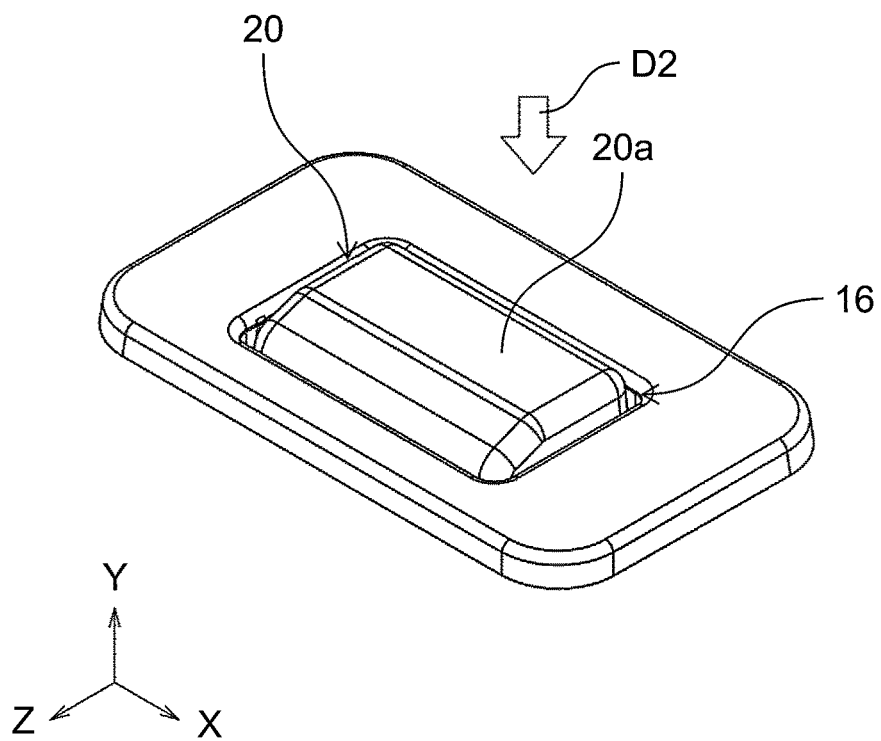
FIG. 4B is an enlarged view illustrating an example of the operation of the pop-up component in the region Z1 in FIG. 1.

FIGS. 4A and 4B are enlarged views illustrating an example of the operation of pop-up component 20 in region Z1 in FIG. 1. FIG. 4A illustrates a state in which pop-up component 20 protrudes from first hole 16, and FIG. 4B illustrates a state in which pop-up component 20 is housed in first hole 16. Note that FIG. 4A illustrates a state in which electronic device 2 is removed from port replicator 1, and FIG. 4B illustrates a state in which electronic device 2 is attached to port replicator 1. In a state where electronic device 2 is removed from port replicator 1, electronic device 2 and the port replicator are not electrically connected. In addition, in a state where electronic device 2 is attached to port replicator 1, electronic device 2 and the port replicator are electrically connected.

As illustrated in FIG. 4A, in a state where electronic device 2 is not attached to port replicator 1, pop-up component 20 protrudes from first hole 16. Specifically, pop-up component 20 has moved in protruding direction D1 protruding from first hole 16. In the present exemplary embodiment, pop-up component 20 is biased in protruding direction D1 by first elastic member 21 (to be described later) (see FIG. 4C). Note that "pop-up component 20 protrudes from first hole 16" means that most of pop-up component 20 only needs to protrude from first hole 16, and a part of pop-up component 20 may be disposed in first hole 16.

As illustrated in FIG. 4B, in a state where electronic device 2 is attached to port replicator 1, pop-up component 20 is housed in first hole 16. Specifically, pop-up component 20 has moved in housing direction D2. Housing direction D2 is a direction opposite to protruding direction D1, and is a direction in which pop-up component 20 is housed in first hole 16. In the present exemplary embodiment, electronic device 2 is pushed toward placement surface 11a of main body 11, whereby pop-up component 20 is pushed against the bottom surface of electronic device 2 and is housed in first hole 16. Note that "pop-up component 20 is housed in first hole 16" means that most of pop-up component 20 only needs to be housed in first hole 16, and a part of pop-up component 20 may protrude from first hole 16.

Figure 4C:
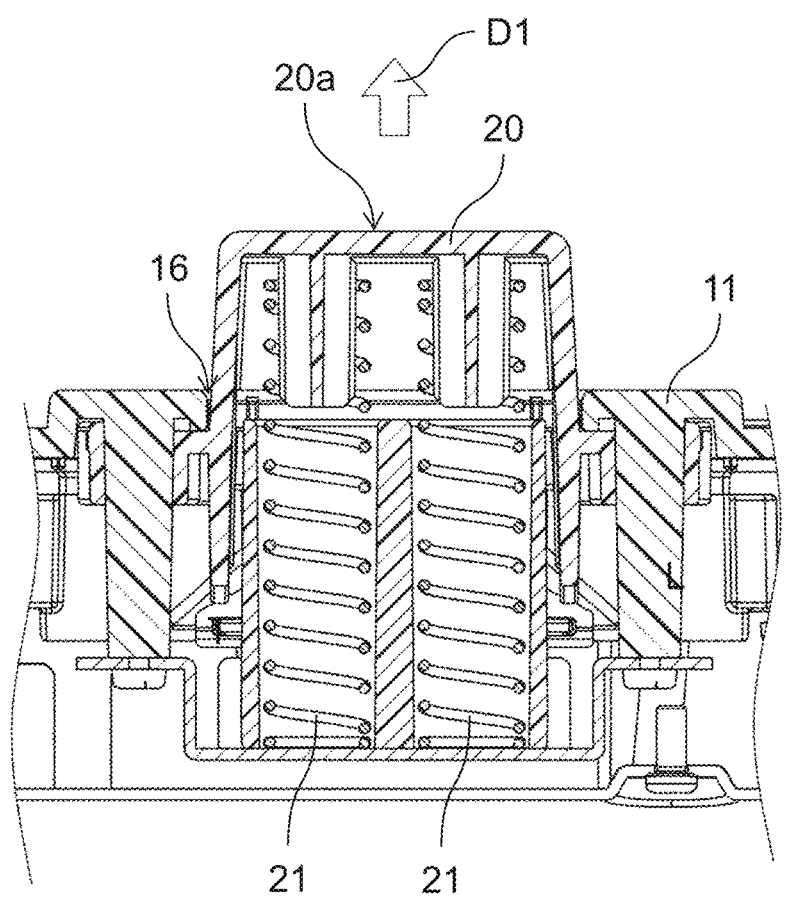
FIG. 4C is a cross-sectional view of the pop-up component illustrated in FIG. 4A taken along line A-A.

FIG. 4C is a cross-sectional view of pop-up component 20 shown in FIG. 4A taken along line A-A. As illustrated in FIG. 4C, pop-up component 20 is biased in protruding direction D1 by first elastic member 21. First elastic member 21 is, for example, a coil spring. In the present exemplary embodiment, two first elastic members 21 are disposed inside pop-up component 20, and bias pop-up component 20 in protruding direction D1. As a result, in a state where electronic device 2 is not attached to port replicator 1, first elastic member 21 maintains pop-up component 20 in a state of protruding from first hole 16.

<Hook Component>

Hook component 30 is disposed in second hole 17 of main body 11, and engages with electronic device 2. Specifically, hook component 30 is engaged with engaged portion 2c disposed in bottom recess 2b provided in a bottom surface of electronic device 2 described later (see FIG. 7B). In the present exemplary embodiment, port replicator 1 has two hook components 30.

Figure 5A:
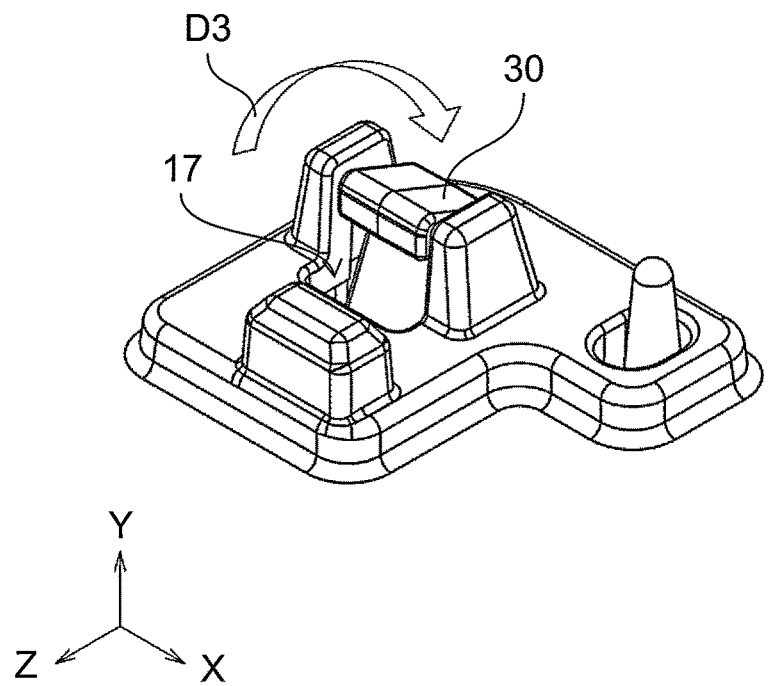
FIG. 5A is an enlarged view illustrating an example of operation of a hook component in a region Z2 in FIG. 1.
Figure 5B:
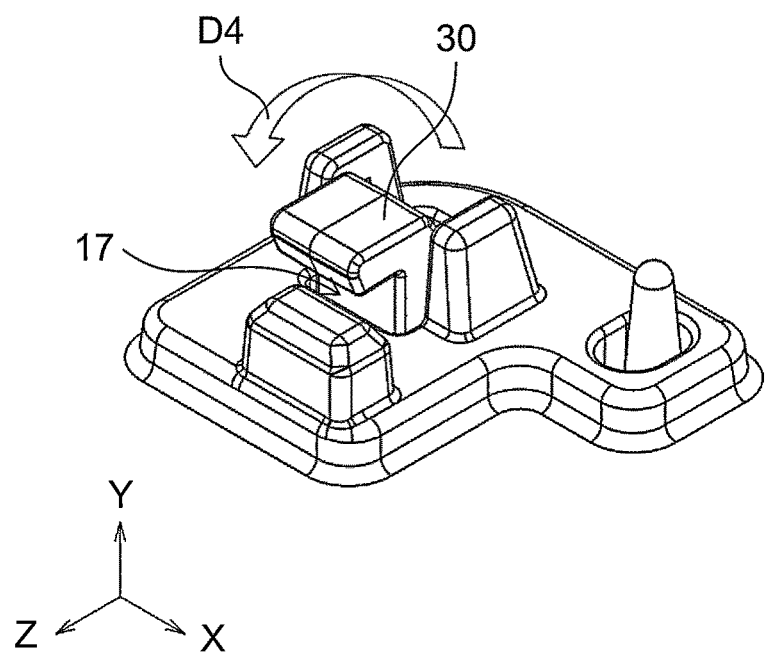
FIG. 5B is an enlarged view illustrating an example of the operation of the hook component in the region Z2 in FIG. 1.

FIGS. 5A and 5B are enlarged views illustrating an example of the operation of hook component 30 in the region Z2 of FIG. 1. FIG. 5A illustrates a state in which hook component 30 is disposed at the engagement release position where the engagement with electronic device 2 is released, and FIG. 5B illustrates a state in which hook component 30 is disposed at the engagement position for engaging with electronic device 2. Note that FIG. 5A illustrates a state in which electronic device 2 is removed from port replicator 1, and FIG. 5B illustrates a state in which electronic device 2 is attached to port replicator 1.

As illustrated in FIG. 5A, in a state where electronic device 2 is not attached to port replicator 1, hook component 30 rotates in first rotation direction D3 and is disposed at an engagement release position where the engagement with electronic device 2 is released. First rotation direction D3 is a direction in which hook component 30 is rotated toward the back side of port replicator 1.

As illustrated in FIG. 5B, in a state where electronic device 2 is attached to port replicator 1, hook component 30 rotates in second rotation direction D4 and is disposed at the engagement position to be engaged with electronic device 2. Second rotation direction D4 is a direction opposite to first rotation direction D3, and is a direction in which hook component 30 is rotated to the front side of port replicator 1.

Pop-up component 20 and hook component 30 operate in conjunction with each other. Specifically, when pop-up component 20 moves in protruding direction D1 from the state of being housed in first hole 16, hook component 30 rotates in first rotation direction D3 and is disposed at the engagement release position. When pop-up component 20 moves in housing direction D2 from the state of protruding from first hole 16, hook component 30 rotates in second rotation direction D4 and is disposed at the engagement position.

Next, an example of a main configuration of port replicator 1 that interlocks pop-up component 20 and hook component 30 will be described in detail with reference to FIGS. 6A to 6E.

Figure 6A:
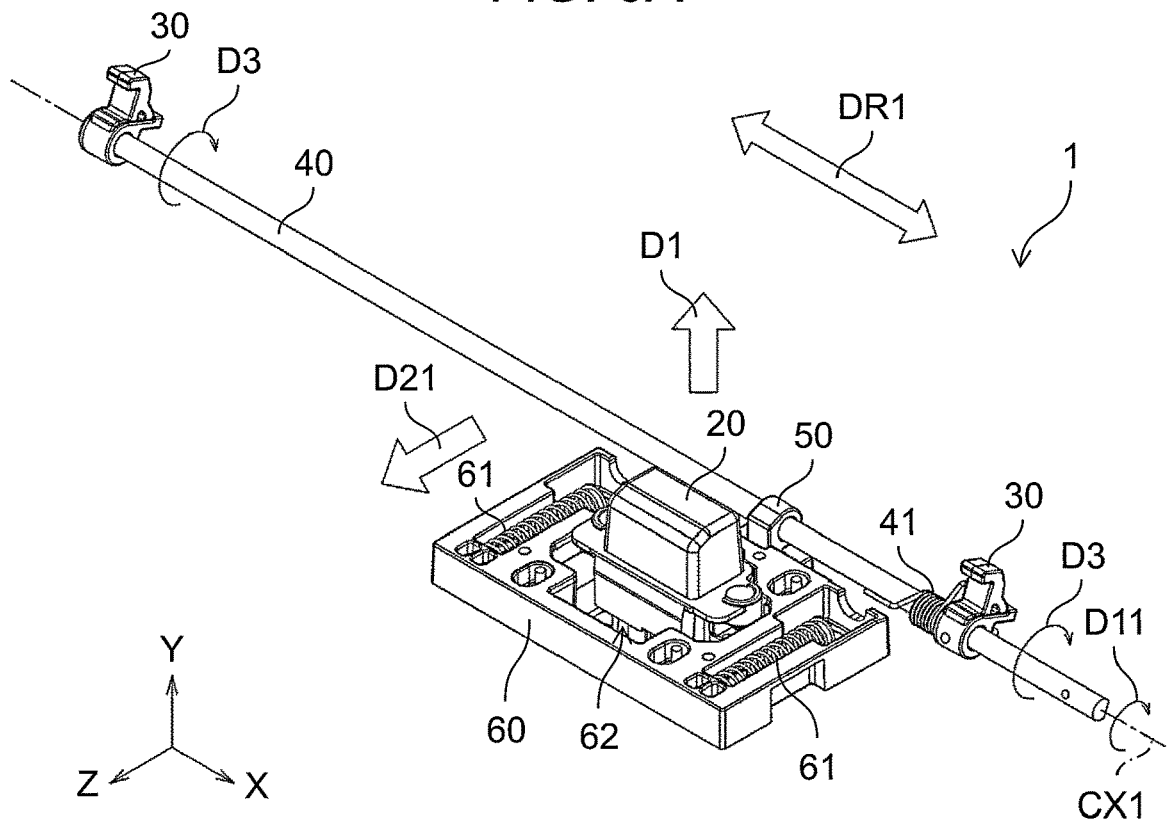
FIG. 6A is a perspective view illustrating an example of a main configuration of the port replicator.
Figure 6B:
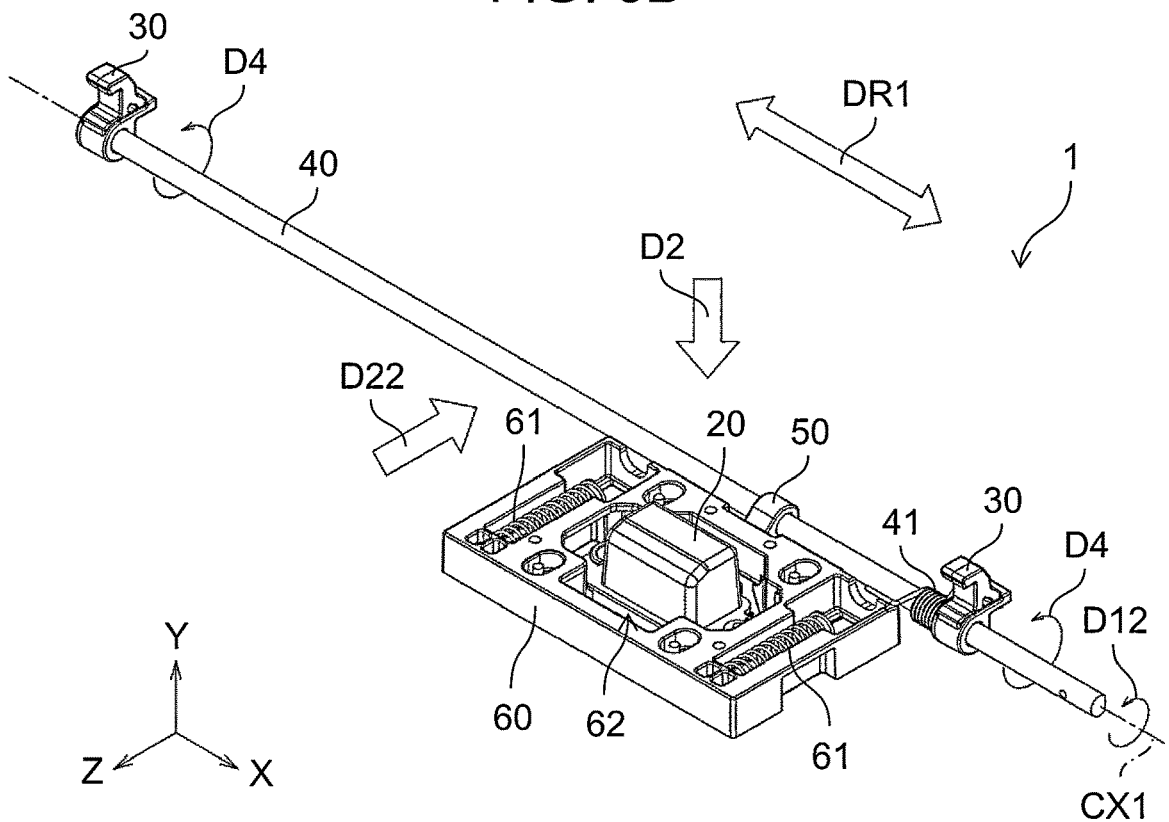
FIG. 6B is a perspective view illustrating an example of a main configuration of the port replicator.
Figure 6C:
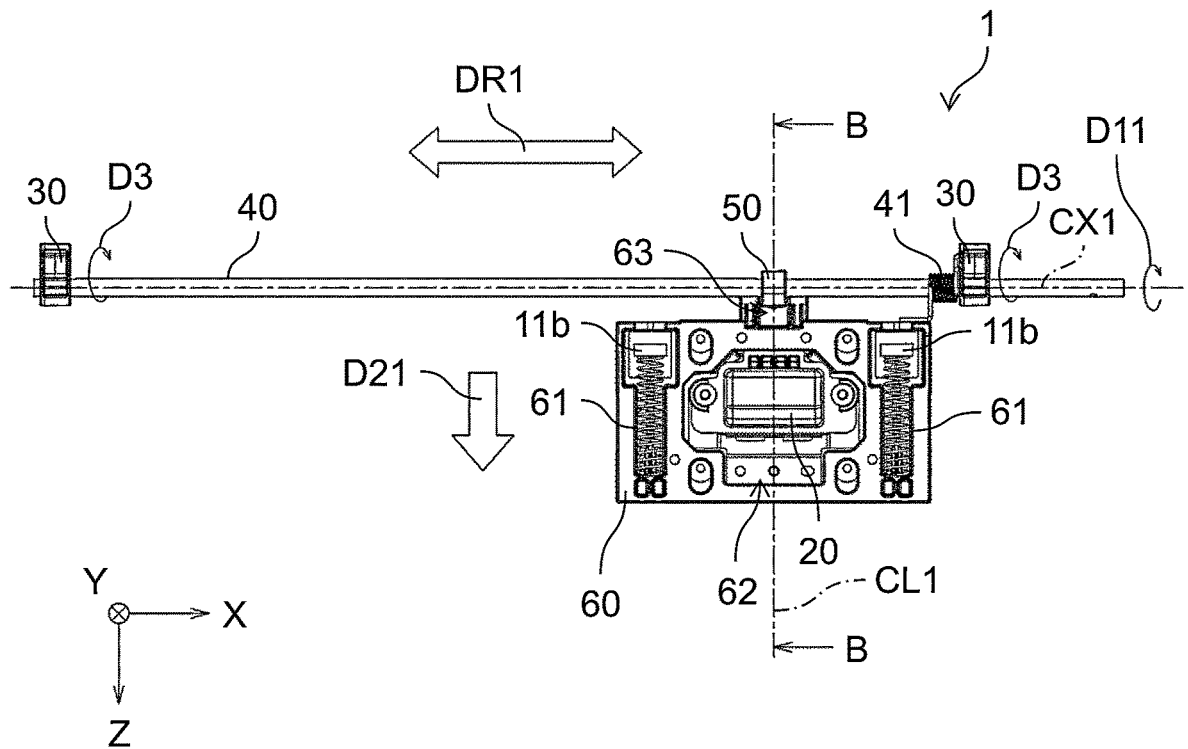
FIG. 6C is a plan view illustrating an example of a main configuration of the port replicator.
Figure 6D:
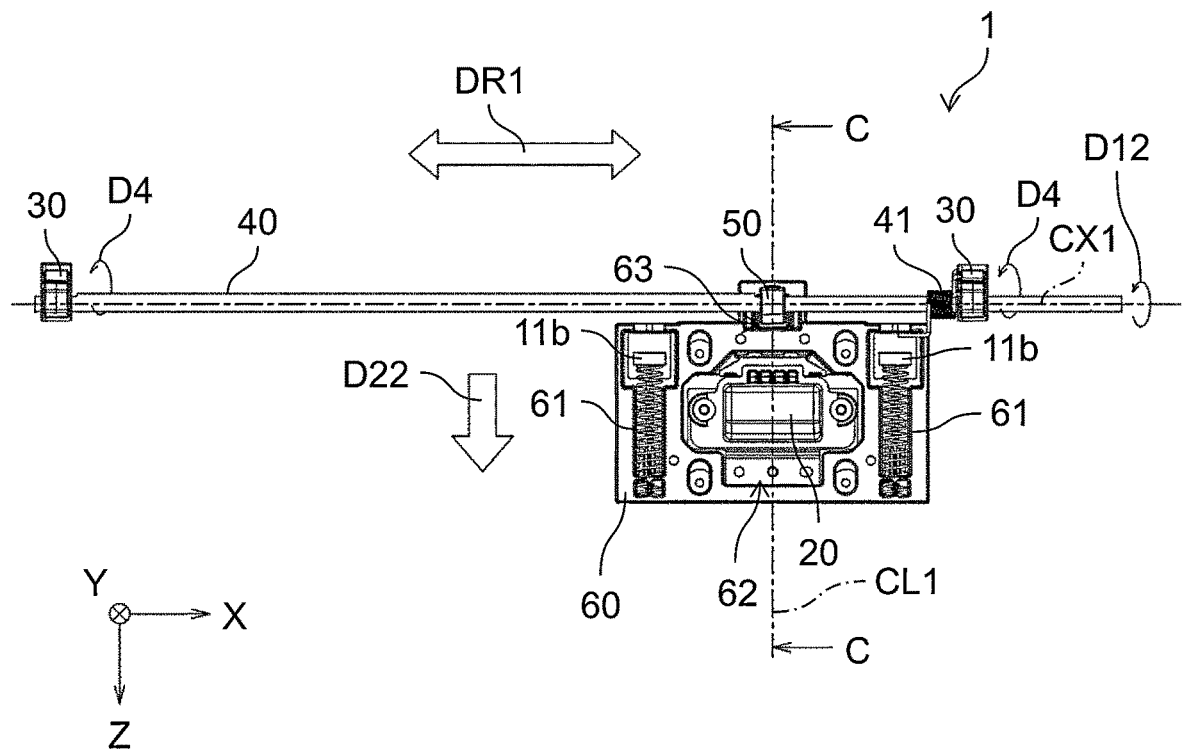
FIG. 6D is a plan view illustrating an example of a main configuration of the port replicator.
Figure 6E:
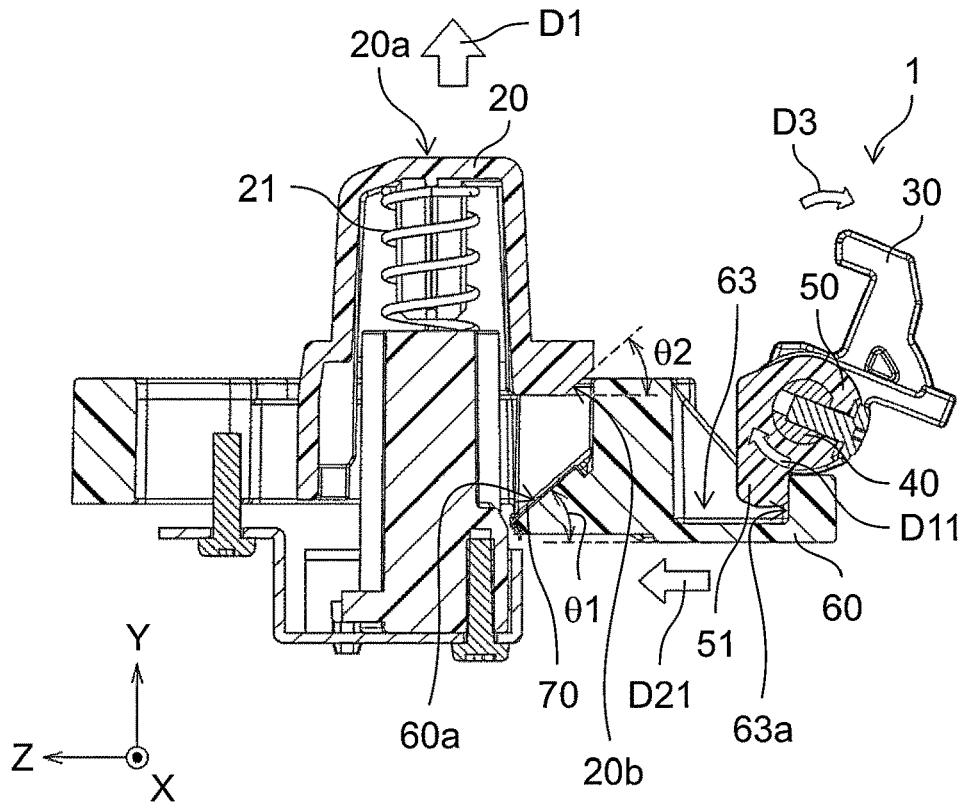
FIG. 6E is a cross-sectional view of the pop-up component, a stopper, and a link component illustrated in FIG. 6C taken along line B-B.
Figure 6F:
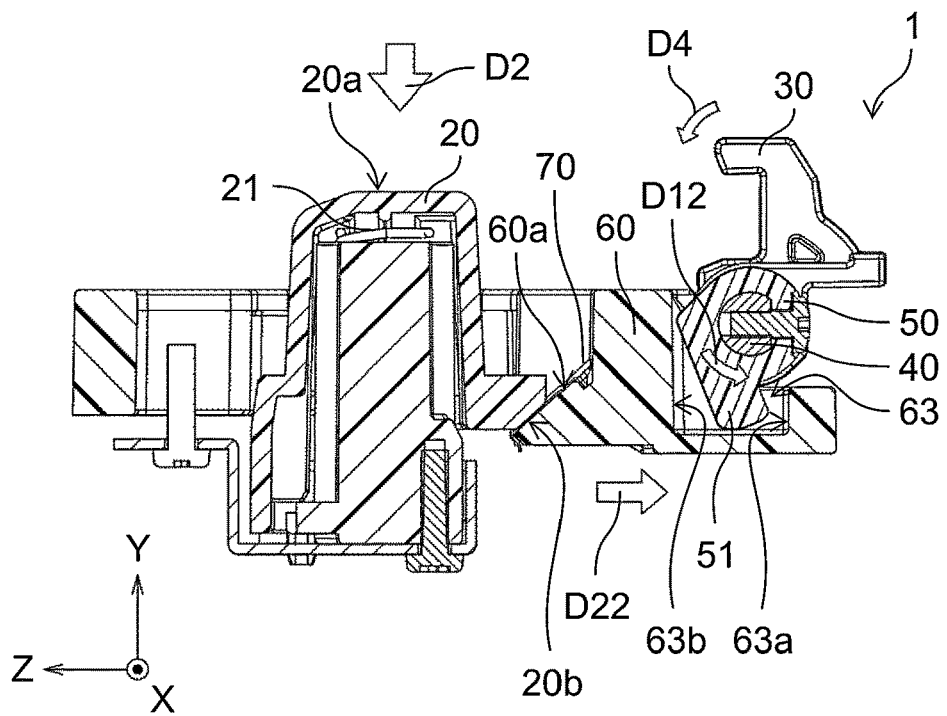
FIG. 6F is a cross-sectional view of the pop-up component, the stopper, and the link component illustrated in FIG. 6D taken along line C-C.

FIGS. 6A and 6B are perspective views illustrating an example of a main configuration of port replicator 1. FIGS. 6C and 6D are perspective views illustrating an example of a main configuration of port replicator 1. FIG. 6E is a cross-sectional view of pop-up component 20, stopper 50, and link component 60 illustrated in FIG. 6C taken along line B-B. FIG. 6F is a cross-sectional view of pop-up component 20, stopper 50, and link component 60 illustrated in FIG. 6D taken along line C-C. FIGS. 6A and 6C illustrate a state in which electronic device 2 is removed from port replicator 1, and FIGS. 6B and 6D illustrate a state in which electronic device 2 is attached to port replicator 1. Line B-B and line C-C illustrated in FIGS. 6C and 6D, respectively, are center line CL1 of link component 60.

As shown in FIGS. 6A to 6F, port replicator 1 includes pop-up component 20, hook component 30, shaft 40, stopper 50, and link component 60.

<Shaft>

Shaft 40 is rotatably disposed within main body 11. Shaft 40 is made of a rod-like member. Shaft 40 rotates about rotation axis CX1. Rotation shaft CX1 extends in the X direction of main body 11. That is, axial direction DR1 of shaft 40 is the X direction. Specifically, shaft 40 is rotatable in first rotation direction D11 and second rotation direction D12 opposite to first rotation direction D11.

Hook component 30 is fixed to shaft 40. Therefore, when shaft 40 rotates, hook component 30 rotates. Specifically, when shaft 40 rotates in first rotation direction D11, hook component 30 rotates in first rotation direction D3. When shaft 40 rotates in second rotation direction D12, hook component 30 rotates in second rotation direction D4.

Second elastic member 41 is attached to shaft 40. Second elastic member 41 is, for example, a torsion spring. Second elastic member 41 biases shaft 40 in second rotation direction D12. That is, second elastic member 41 applies a force so that shaft 40 rotates in second rotation direction D12.

<Stopper>

Stopper 50 is fixed to shaft 40. Stopper 50 is in contact with link component 60. Stopper 50 regulates the rotation of shaft 40 by coming into contact with link component 60. Specifically, stopper 50 rotates shaft 40 in first rotation direction D11 by coming into contact with link component 60. When the contact between stopper 50 and link component 60 is released, shaft 40 is rotated in second rotation direction D12 by second elastic member 41.

As illustrated in FIGS. 6E and 6F, stopper 50 has protrusion 51 protruding in a direction intersecting axial direction DR1 of shaft 40. Protrusion 51 has, for example, a plate shape. When shaft 40 rotates, protrusion 51 rotates about rotation axis CX1 of shaft 40.

Protrusion 51 regulates the rotation of shaft 40 by coming into contact with link component 60. Specifically, protrusion 51 contacts stopper contact surface 63*a* provided in recess 63 of link component 60. When protrusion 51 comes into contact with stopper contact surface 63*a*, shaft 40 rotates in first rotation direction D11 and is maintained in a rotated state. When protrusion 51 is separated from stopper contact surface 63*a*, shaft 40 rotates in second rotation direction D12.

<Link Component>

As illustrated in FIGS. 6A to 6F, link component 60 is disposed in main body 11 so as to be movable in a direction (movement direction) intersecting axial direction DR1 of shaft 40. Specifically, link component 60 is movable in a direction orthogonal to axial direction DR1 of shaft 40 in plan view, that is, in the Z direction. Link component 60 is movable in first direction D21 away from shaft 40 and second direction D22 opposite to first direction D21 in the Z direction. Second direction D22 is a direction approaching shaft 40.

Link component 60 is biased in first direction D21 by third elastic member 61. Third elastic member 61 is, for example, a coil spring. Third elastic member 61 biases link component 60 in first direction D21 with inner wall 11*b* provided inside main body 11 as a fulcrum. Inner wall 11*b* is relatively fixed to link component 60. In the present exemplary embodiment, inner wall 11*b* is disposed in a through hole provided in link component 60.

In a state where pop-up component 20 moves in protruding direction D1 and protrudes from first hole 16, link component 60 moves in first direction D21 by third elastic member 61 and comes into contact with stopper 50. In the present specification, the position of link component 60 in contact with stopper 50 is referred to as a first position. At the first position, link component 60 moves in first direction D21 and stops by coming into contact with inner wall 11*b*. The stop of the movement of link component 60 in first direction D21 is not limited to the contact with inner wall 11*b*. The stop of the movement of link component 60 in first direction D21 may be realized by a guide provided outside link component 60.

In a state where pop-up component 20 moves in housing direction D2 and is housed in first hole 16, link component 60 moves in second direction D22 by coming into contact with pop-up component 20 and releases the contact with stopper 50. In the present specification, the position of link component 60 that releases the contact with stopper 50 is referred to as a second position. At the second position, link component 60 moves in second direction D22 and is not in contact with stopper 50.

Through hole 62 is provided at the center of link component 60 when viewed from the direction (Y direction) orthogonal to placement surface 11*a* of main body 11. Pop-up component 20 is disposed in through hole 62.

As illustrated in FIGS. 6E and 6F, link component 60 has first surface 60*a* that comes into contact with pop-up component 20. First surface 60*a* is a flat surface and is inclined with respect to the movement direction (Z direction) of link component 60. Specifically, first surface 60*a* is inclined with respect to first direction D21 and second direction D22. In other words, first surface 60*a* is inclined with respect to placement surface 11*a* of main body 11.

For example, first surface 60*a* has inclination angle θ1 of 35° or more and less than 45° with respect to the movement direction (Z direction) of link component 60. Preferably, inclination angle θ1 of first surface 60*a* is between 38° and 42° (inclusive).

Pop-up component 20 has second surface 20*b* in contact with link component 60. Second surface 20*b* is a flat surface and is inclined with respect to the movement direction (Z direction) of link component 60. Specifically, second surface 20*b* is inclined with respect to first direction D21 and second direction D22. In other words, second surface 20*b* is inclined with respect to placement surface 11*a* of main body 11.

For example, second surface 20*b* has inclination angle θ2 of 350 or more and less than 45° with respect to the movement direction (Z direction) of link component 60. Preferably, inclination angle θ2 of second surface 20*b* is between 38° and 42° (inclusive).

In the present exemplary embodiment, inclination angle θ1 of first surface 60*a* is equal to inclination angle θ2 of second surface 20*b*.

Contact plate 70 is disposed on first surface 60*a* of link component 60. Contact plate 70 is made of a material different from that of pop-up component 20. Link component 60 and pop-up component 20 are made of resin, for example. Contact plate 70 is made of, for example, a metal material or a resin different from the resin forming pop-up component 20.

First surface 60*a* is in contact with second surface 20*b* via contact plate 70. This makes it possible to reduce friction between second surface 20*b* and contact plate 70 when pop-up component 20 brings second surface 20*b* into contact with contact plate 70 and moves link component 60 in second direction D22. As a result, link component 60 is pushed by pop-up component 20 and can be smoothly moved in second direction D22.

In the present exemplary embodiment, an example in which contact plate 70 is disposed on first surface 60*a* has been described, but the present invention is not limited thereto. For example, contact plate 70 may be disposed on second surface 20*b*.

In the present exemplary embodiment, when viewed from the direction (Y direction) orthogonal to placement surface 11*a* of main body 11, two third elastic members 61 are arranged with pop-up component 20 interposed therebetween. Specifically, two third elastic members 61 are symmetrically arranged with pop-up component 20 interposed therebetween. Accordingly, when two third elastic members 61 bias link component 60, stress applied to link component 60 can be dispersed.

Link component 60 is provided with recess 63 in which stopper 50 is disposed. The inner wall of recess 63 is provided with stopper contact surface 63*a* that comes into contact with stopper 50. Stopper contact surface 63*a* is formed flat. When viewed from the direction (Y direction) orthogonal to placement surface 11*a* of main body 11, stopper contact surface 63*a* is disposed at the center of link component 60. Specifically, link component 60 has a symmetrical shape when viewed from a direction (Y direction) orthogonal to placement surface 11*a* of main body 11. That is, when viewed from the Y direction, link component 60 has a symmetrical shape about center line CL1 extending in the Z direction. Further, shaft 40 is disposed at the center of link component 60 in axial direction DR1 of shaft 40. As a result, link component 60 can smoothly move in the direction (Z direction) orthogonal to axial direction DR1 of shaft 40.

When viewed from the direction (Y direction) orthogonal to placement surface 11*a* of main body 11, stopper 50 and pop-up component 20 are linearly arranged in the direction (Z direction) orthogonal to axial direction DR1 of shaft 40. As a result, link component 60 can move more smoothly in the direction (Z direction) orthogonal to axial direction DR1 of shaft 40.

Next, an example of an operation in the main configuration of port replicator 1 will be described.

As illustrated in FIGS. 6A, 6C, and 6E, in a state where electronic device 2 is not attached to port replicator 1, pop-up component 20 is biased in protruding direction D1 by first elastic member 21 and moves in protruding direction D1. As a result, pop-up component 20 protrudes from first hole 16 (see FIG. 4A).

Since link component 60 is biased in first direction D21 by third elastic member 61, the link component moves in first direction D21 and is disposed at the first position in contact with stopper 50. As illustrated in FIG. 6E, when link component 60 moves in first direction D21, protrusion 51 of stopper 50 comes into contact with stopper contact surface 63*a*.

When protrusion 51 of stopper 50 comes into contact with stopper contact surface 63*a* of link component 60, shaft 40 rotates in first rotation direction D11. In addition, while link component 60 is disposed at the first position, shaft 40 is held in a state of being rotated in first rotation direction D11.

When shaft 40 rotates in first rotation direction D11, hook component 30 rotates in first rotation direction D3, and is disposed at the engagement release position where the engagement with electronic device 2 is released. While shaft 40 is held in a state of being rotated in first rotation direction D11, hook component 30 remains disposed in the engagement release position (see FIG. 5A).

As illustrated in FIGS. 6B, 6D, and 6F, in a state where electronic device 2 is attached to port replicator 1, pop-up component 20 comes into contact with electronic device 2 and moves in housing direction D2. As a result, pop-up component 20 is housed in first hole 16 (see FIG. 4B).

Link component 60 moves in second direction D22 by coming into contact with pop-up component 20, and is disposed at the second position where the contact with stopper 50 is released. As illustrated in FIG. 6F, when link component 60 moves in second direction D22, protrusion 51 of stopper 50 is separated from stopper contact surface 63*a*. As a result, contact between protrusion 51 of stopper 50 and stopper contact surface 63*a* is released.

When link component 60 is disposed at the second position, a gap is provided between link component 60 and stopper 50. As shown in FIG. 6F, stopper 50 is disposed in recess 63 of link component 60, and protrusion 51 rotates in recess 63. When link component 60 is disposed at the first position, protrusion 51 of stopper 50 comes into contact with stopper contact surface 63*a* (see FIG. 6E). On the other hand, when link component 60 is disposed at the second position, protrusion 51 of stopper 50 is separated from stopper contact surface 63*a*. That is, when link component 60 is disposed at the second position, link component 60 is not in contact with stopper 50. At this time, stopper 50 is disposed at a position not in contact with the inner wall of recess 63 and is in a free state. Specifically, inner wall surface 63*b* facing stopper contact surface 63*a* is disposed in recess 63. When link component 60 is disposed at the second position, stopper 50 is separated from inner wall surface 63*b*. As a result, when link component 60 is disposed at the second position, it is possible to suppress stopper 50 from colliding with link component 60 and being damaged.

When the contact between protrusion 51 of stopper 50 and stopper contact surface 63*a* of link component 60 is released, shaft 40 rotates in second rotation direction D12 by the biasing force of second elastic member 41. Shaft 40 is held in a state of being rotated in second rotation direction D12.

When shaft 40 rotates in second rotation direction D12, hook component 30 rotates in second rotation direction D4, and is disposed at the engagement position engaged with electronic device 2. While shaft 40 is held in a state of being rotated in second rotation direction D12, hook component 30 remains disposed at the engagement position (see FIG. 5B).

As described above, in port replicator 1, pop-up component 20, hook component 30, shaft 40, stopper 50, and link component 60 operate in conjunction with one another.

Next, an example of the operation of hook component 30 will be described with reference to FIGS. 7A and 7B.

Figure 7A:
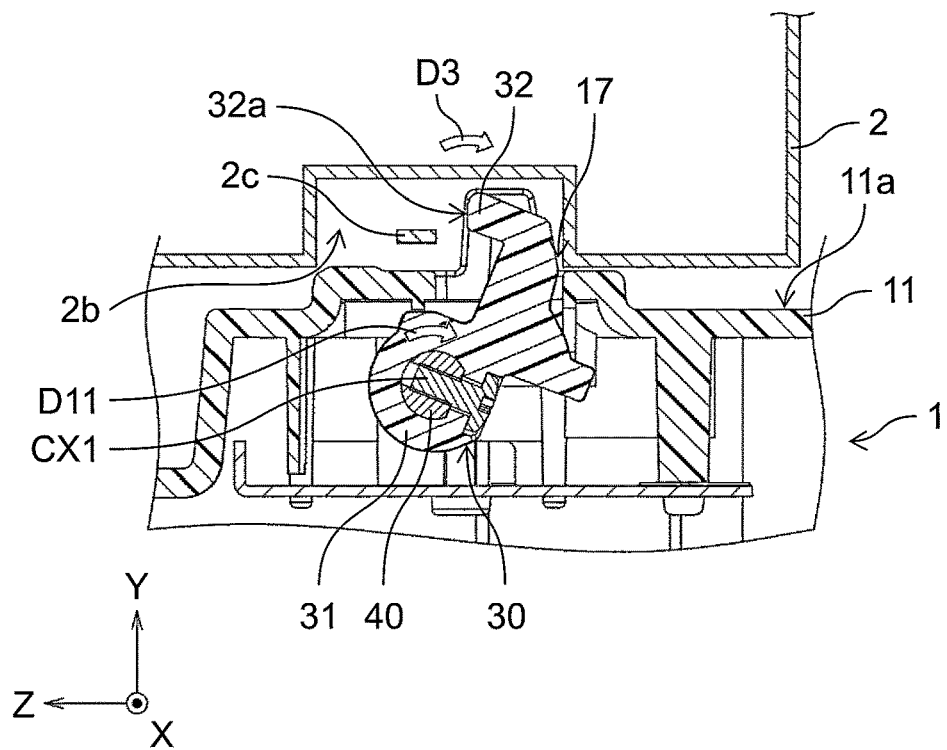
FIG. 7A is a cross-sectional view illustrating an example of the operation of the hook component.
Figure 7B:
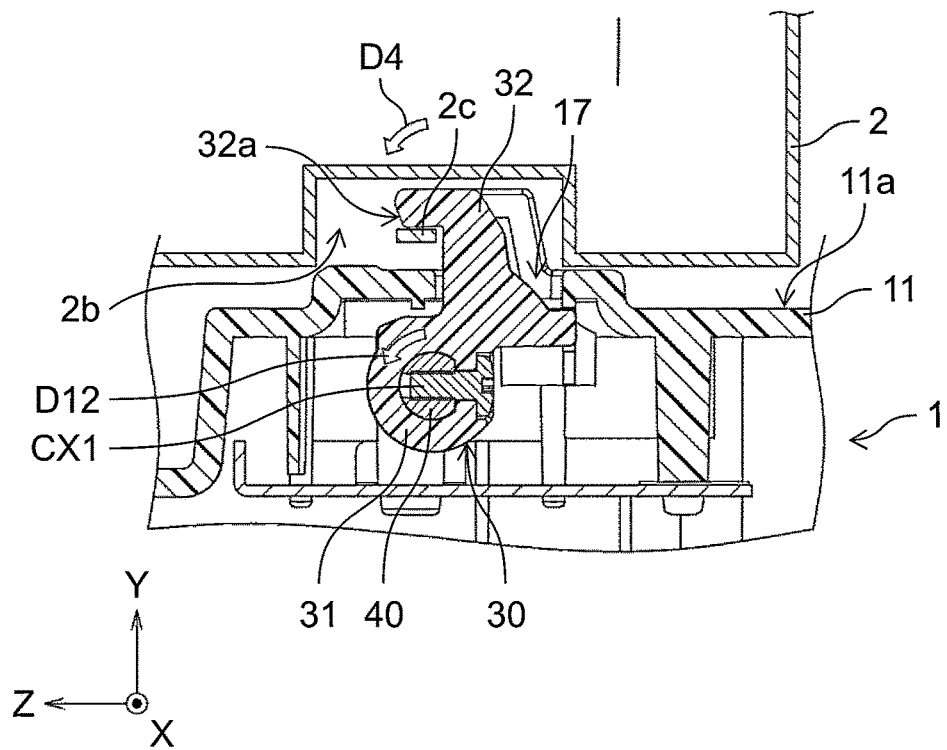
FIG. 7B is a cross-sectional view illustrating an example of the operation of the hook component.

FIGS. 7A and 7B are cross-sectional views illustrating an example of the operation of hook component 30. FIG. 7A illustrates a state in which hook component 30 is disposed at the engagement release position to release the engagement with electronic device 2. FIG. 7B illustrates a state in which hook component 30 is disposed at the engagement position and is engaged with electronic device 2.

As illustrated in FIGS. 7A and 7B, hook component 30 includes hook body 31 and engaging portion 32.

Hook body 31 is fixed to shaft 40. Hook body 31 is, for example, a frame-shaped member surrounding the outer periphery of shaft 40.

Engaging portion 32 engages with engaged portion 2*c* disposed in bottom recess 2*b* provided on the bottom surface of electronic device 2. Engaging portion 32 extends from hook body 31 in a first extending direction intersecting rotation axis CX1 of the shaft, and is bent in a second extending direction intersecting the first extending direction. That is, engaging portion 32 has a first portion extending from hook body 31 in a first extending direction intersecting axial direction DR1 of the shaft and a second portion extending in a second extending direction intersecting the first extending direction. For example, engaging portion 32 has an inverted L shape.

Engaging portion 32 has end surface 32a inclined toward the inside of engaging portion 32 at a portion extending in the second extending direction. That is, the second portion of engaging portion 32 has end surface 32a inclined toward the inside of engaging portion 32. End surface 32a is a surface provided at a distal end of a portion extending in the second extending direction.

Engaging portion 32 is disposed in second hole 17 of main body 11. When electronic device 2 is placed on placement surface 11a, engaging portion 32 is disposed in bottom recess 2b of electronic device 2.

As illustrated in FIG. 7A, when shaft 40 rotates in first rotation direction D11, hook component 30 rotates in first rotation direction D3. At this time, engaging portion 32 is rotated in first rotation direction D3 in bottom recess 2b to be separated from engaged portion 2c. Accordingly, the engagement between engaging portion 32 and engaged portion 2c is released.

In addition, since end surface 32a of engaging portion 32 is inclined toward the inside of engaging portion 32, engaging portion 32 is easily detached from engaged portion 2c when engaging portion 32 moves in first rotation direction D3. When engaging portion 32 moves in second rotation direction D4, end surface 32a of engaging portion 32 abuts on engaged portion 2c, and engaging portion 32 is guided to the upper side of engaged portion 2c by the inclination of end surface 32a. As a result, engaging portion 32 can be prevented from moving to the lower side of engaged portion 2c, and engaging portion 32 is easily engaged with engaged portion 2c.

As illustrated in FIG. 7B, when shaft 40 rotates in second rotation direction D12, hook component 30 rotates in second rotation direction D4. At this time, engaging portion 32 rotates in second rotation direction D4 in bottom recess 2b to engage with engaged portion 2c. As a result, electronic device 2 is fixed to port replicator 1.

[Effects]

According to port replicator 1 of the first exemplary embodiment, the following effects can be achieved.

Port replicator 1 is a port replicator that extends input and output terminals 15a to 15e of electronic device 2, and includes main body 11, pop-up component 20, hook component 30, shaft 40, stopper 50, and link component 60. Main body 11 has placement surface 11a on which electronic device 2 is placed. Placement surface 11a is provided with first hole 16 and second hole 17. Pop-up component 20 is disposed in first hole 16 so as to be movable in the direction (Y direction) intersecting placement surface 11a. Shaft 40 is rotatably disposed within main body 11. Hook component 30 is disposed in second hole 17 and fixed to shaft 40. Stopper 50 is disposed within main body 11 and is fixed to shaft 40. Link component 60 is disposed within main body 11 so as to be movable in a direction (Z direction) intersecting axial direction DR1 of shaft 40, and is in contact with stopper 50. Pop-up component 20 comes into contact with link component 60 by moving in a direction (Y direction) intersecting placement surface 11a. Link component 60 moves by the contact with pop-up component 20 to release the contact with stopper 50. Shaft 40 rotates when stopper 50 and link component 60 are released from contact with each other. Hook component 30 is rotated by the rotation of shaft 40.

With such a configuration, electronic device 2 can be attached and detached with a simple configuration. In port replicator 1, pop-up component 20, hook component 30, shaft 40, stopper 50, and link component 60 operate in conjunction with one another. As a result, the number of components for realizing the configuration for attaching and detaching electronic device 2 can be reduced, and electronic device 2 can be easily attached to and detached from port replicator 1.

Pop-up component 20 is movable in a protruding direction D1 protruding from first hole 16 and housing direction D2 opposite to protruding direction D1. Shaft 40 is rotatable in first rotation direction D11 and second rotation direction D12 opposite to first rotation direction D11. Link component 60 is movable in first direction D21 away from shaft 40 and second direction D22 opposite to first direction D21. Port replicator 1 includes first elastic member 21, second elastic member 41, and third elastic member 61. First elastic member 21 biases pop-up component 20 in protruding direction D1. Second elastic member 41 biases shaft 40 in second rotation direction D12. Third elastic member 61 biases link component 60 in first direction D21 away from shaft 40.

With such a configuration, the electronic device can be attached and detached with a simpler configuration. Specifically, the movement direction can be controlled by biasing pop-up component 20, shaft 40, and link component 60 by first elastic member 21, second elastic member 41, and third elastic member 61. As a result, pop-up component 20, hook component 30, shaft 40, stopper 50, and link component 60 can operate in conjunction with one another with a simpler configuration.

In a state where pop-up component 20 is moved in protruding direction D1 by first elastic member 21 and protrudes from first hole 16, link component 60 is moved in first direction D21 by third elastic member 61 and disposed at the first position in contact with stopper 50. Shaft 40 is held in a state of being rotated in first rotation direction D11 by stopper 50 coming into contact with link component 60, and hook component 30 is disposed at an engagement release position where the engagement with electronic device 2 is released. In a state where pop-up component 20 moves in housing direction D2 and is housed in first hole 16, link component 60 moves in second direction D22 by coming into contact with pop-up component 20 and is disposed at the second position where the contact with stopper 50 is released. When stopper 50 and link component 60 are released from contact with each other, shaft 40 is rotated in second rotation direction D12 by second elastic member 41, and hook component 30 is disposed at the engagement position to be engaged with electronic device 2 by the rotation of shaft 40.

With such a configuration, an electrical connection mechanism between electronic device 2 and port replicator 1 by the movement of pop-up component 20 and a lock mechanism between electronic device 2 and port replicator 1 by the rotation of hook component 30 can be interlocked. As a result, the number of components for realizing the electrical connection mechanism and the lock mechanism can be reduced, and the electronic device can be attached and detached with a simpler configuration. Specifically, the movement direction can be controlled by biasing pop-up component 20, shaft 40, and link component 60 by first elastic member 21, second elastic member 41, and third elastic member 61. As a result, pop-up component 20, hook component 30, shaft 40, stopper 50, and link component 60 can operate in conjunction with one another with a simpler configuration.

When link component 60 is disposed at the second position, a gap is provided between link component 60 and stopper 50. With such a configuration, when link component 60 is disposed at the second position, a free state in which no force is applied to stopper 50 can be obtained. As a result, it is possible to suppress stopper 50 from colliding with link component 60 and being damaged.

Link component 60 has first surface 60a in contact with pop-up component 20, and first surface 60a is inclined with respect to the movement direction (Z direction) of link component 60. With such a configuration, the movement amount of link component 60 can be increased. In addition, the movement of link component 60 can be made smooth.

Pop-up component 20 has second surface 20b in contact with link component 60, and second surface 20b is inclined with respect to the movement direction (Z direction) of link component 60. With such a configuration, the movement amount of link component 60 can be further increased. In addition, the movement of link component 60 can be made smoother.

Contact plate 70 disposed on either first surface 60a or second surface 20b is provided, and contact plate 70 is made of a material different from materials of pop-up component 20 and link component 60. With such a configuration, since first surface 60a or second surface 20b slides with respect to contact plate 70, friction caused by contact between pop-up component 20 and link component 60 can be reduced. For example, in a case where pop-up component 20 and link component 60 are formed of the same resin, when first surface 60a and second surface 20b come into contact with each other without contact plate 70 interposed therebetween, friction tends to increase. When first surface 60a and second surface 20b are in contact with each other via contact plate 70 made of a material different from the materials of pop-up component 20 and link component 60, friction can be reduced. This facilitates the movement of pop-up component 20 and link component 60 in contact with each other.

First surface 60a has inclination angle θ1 of 35° or more and less than 45° with respect to the movement direction (Z direction) of link component 60. With such a configuration, the movement of link component 60 can be made smooth while sufficiently securing the movement amount of link component 60.

When viewed from the direction (Y direction) orthogonal to placement surface 11a of main body 11, through hole 62 is provided at the center of link component 60, and pop-up component 20 is disposed in through hole 62. With such a configuration, it is easy to interlock pop-up component 20 and link component 60 with a simpler configuration.

Third elastic member 61 includes a plurality of springs arranged symmetrically with pop-up component 20 interposed therebetween when viewed from the direction (Y direction) orthogonal to placement surface 11a of main body 11. With such a configuration, the stress generated in link component 60 by the biasing force of third elastic member 61 can be dispersed, and the durability of link component 60 can be improved. In addition, since the plurality of springs are symmetrically arranged with pop-up component 20 interposed therebetween, it is possible to suppress link component 60 from moving in an inclined manner.

Link component 60 has a stopper contact surface 63a that comes into contact with stopper 50. When viewed from the direction (Y direction) orthogonal to placement surface 11a of main body 11, stopper contact surface 63a is disposed at the center of the end of link component 60 disposed on shaft 40 side. That is, when viewed from the Y direction, stopper contact surface 63a is disposed at the center of link component 60 in axial direction DR1 of shaft 40. With such a configuration, it is possible to suppress link component 60 from moving in an inclined manner and move link component 60 smoothly.

When viewed from the direction (Y direction) orthogonal to placement surface 11a of main body 11, stopper 50 and pop-up component 20 are linearly disposed in the direction (Z direction) orthogonal to axial direction DR1 of shaft 40. With such a configuration, it is easy to interlock pop-up component 20 and link component 60 with a simpler configuration.

Hook component 30 includes hook body 31 and engaging portion 32. Hook body 31 is fixed to shaft 40. Engaging portion 32 extends from hook body 31 in a first extending direction intersecting rotation axis CX1 of shaft 40 and is bent in a second extending direction intersecting the first extending direction. Engaging portion 32 has end surface 32a inclined toward the inside of engaging portion 32 at a portion extending in the second extending direction. With such a configuration, engagement and engagement release of hook component 30 with electronic device 2 can be easily performed.

In the present exemplary embodiment, an example in which first elastic member 21, second elastic member 41, and third elastic member 61 are springs has been described, but the present invention is not limited thereto. For example, first elastic member 21, second elastic member 41, and third elastic member 61 may be made of rubber.

In the present exemplary embodiment, an example in which port replicator 1 includes two hook components 30 has been described, but port replicator 1 may include one or more hook components 30.

In the present exemplary embodiment, an example in which first surface 60a and second surface 20b are formed flat has been described, but first surface 60a and second surface 20b may not be formed flat. For example, at least one of first surface 60a or second surface 20b may be curved.

INDUSTRIAL APPLICABILITY

The present disclosure can be widely applied to a port replicator capable of connecting an electronic device.

REFERENCE MARKS IN THE DRAWINGS 1 port replicator
2 electronic device
2a side recess
2b bottom recess
2c engaged portion
11 main body
11a placement surface
12 connector
13 cover
14 side surface
15a to 15e input and output terminal
16 first hole
17 second hole
18 fixing portion
19 release lever
20 pop-up component
20a support surface
20b second surface
21 first elastic member
30 hook component
31 hook body
32 engaging portion 32a end surface
40 shaft
41 second elastic member
50 stopper
51 protrusion
60 link component
60a first surface
61 third elastic member
62 through hole
63 recess
63a stopper contact surface
70 contact plate

The invention claimed is:

1. A port replicator that extends an input and output terminal of an electronic device, the port replicator comprising:
   a main body including a placement surface on which the electronic device is placed, and a first hole and a second hole provided in the placement surface;
   a pop-up component that is disposed in the first hole and is movable in a direction intersecting the placement surface;
   a shaft that is disposed in the main body and rotatable;
   a hook component that is disposed in the second hole and fixed to the shaft;
   a stopper that is disposed in the main body and fixed to the shaft; and
   a link component that is disposed in the main body, is movable in a movement direction that is a direction intersecting an axial direction of the shaft, and is in contact with the stopper,
   wherein the pop-up component comes into contact with the link component by moving in a direction intersecting the placement surface,
   the link component moves by contact with the pop-up component to release contact between the stopper and the link component,
   the shaft rotates when the stopper and the link component are released from contact with each other, and
   the hook component is rotated by rotation of the shaft to engage with the electronic device.

2. The port replicator according to claim 1, wherein
   the pop-up component is movable in a protruding direction protruding from the first hole and a housing direction opposite to the protruding direction,
   the shaft is rotatable in a first rotation direction and a second rotation direction opposite to the first rotation direction,
   the link component is movable in a first direction away from the shaft and a second direction opposite to the first direction, and
   the port replicator further comprises:
   a first elastic member that biases the pop-up component in the protruding direction;
   a second elastic member that biases the shaft in the second rotation direction; and
   a third elastic member that biases the link component in a first direction away from the shaft.

3. The port replicator according to claim 2, wherein
   in a state where the pop-up component is moved in the protruding direction by the first elastic member and protrudes from the first hole,
   the link component is moved in the first direction by the third elastic member and disposed at a first position at which the link component comes into contact with the stopper,
   the shaft is held in a state of being rotated in the first rotation direction by the stopper coming into contact with the link component,
   the hook component is disposed at an engagement release position where the engagement with the electronic device is released,
   in a state where the pop-up component is moved in the housing direction and housed in the first hole,
   the link component is moved in the second direction by coming into contact with the pop-up component and disposed at a second position at which the link component releases the contact with the stopper,
   the shaft is rotated in the second rotation direction by the second elastic member when the stopper and the link component are released from contact with each other, and
   the hook component is disposed at an engagement position to be engaged with the electronic device by rotation of the shaft.

4. The port replicator according to claim 3, wherein the link component is not in contact with the stopper when the link component is disposed at the second position.

5. The port replicator according to claim 1, wherein
   the link component has a first surface in contact with the pop-up component, and
   the first surface is inclined with respect to the movement direction of the link component.

6. The port replicator according to claim 5, wherein
   the pop-up component has a second surface in contact with the link component, and
   the second surface is inclined with respect to the movement direction of the link component.

7. The port replicator according to claim 6, further comprising a contact plate disposed on one of the first surface and the second surface,
   wherein the contact plate is made of a material different from materials of the pop-up component and the link component.

8. The port replicator according to claim 5, wherein the first surface has an inclination angle of 35° or more and less than 45° with respect to the movement direction of the link component.

9. The port replicator according to claim 1, wherein
   the link component has a through hole provided at a center of the link component when viewed from a direction orthogonal to the placement surface of the main body, and
   the pop-up component is disposed in the through hole.

10. The port replicator according to claim 2, wherein the third elastic member includes at least two springs symmetrically disposed with the pop-up component interposed therebetween when viewed from a direction orthogonal to the placement surface of the main body.

11. The port replicator according to claim 1, wherein
   the link component has a stopper contact surface that comes into contact with the stopper, and
   the stopper contact surface is disposed at a center of the link component in an axial direction of the shaft when viewed from a direction orthogonal to the placement surface of the main body.

12. The port replicator according to claim 11, wherein
   the link component includes a recess in which the stopper is disposed, and
   the stopper contact surface is provided on an inner wall of the recess.

13. The port replicator according to claim 1, wherein the stopper and the pop-up component are linearly disposed in a direction orthogonal to the axial direction of the shaft when viewed from a direction orthogonal to the placement surface of the main body.

14. The port replicator according to claim 1, wherein the hook component includes:
a hook body fixed to the shaft; and
an engaging portion extending from the hook body,
the engaging portion includes:
a first portion extending from the hook body in a first extending direction intersecting the axial direction of the shaft; and
a second portion extending in a second extending direction intersecting the first extending direction, and
the second portion of the engaging portion has an end surface inclined toward an inside of the engaging portion.

* * * * *